US012572141B2

(12) United States Patent
Zhang et al.

(10) Patent No.: US 12,572,141 B2
(45) Date of Patent: Mar. 10, 2026

(54) UNSUPERVISED INTEGRATED METHOD AND DEVICE OF INSTABILITY DETECTION AND FAULT MODULE POSITIONING

(71) Applicant: ZHEJIANG UNIVERSITY, Hangzhou (CN)

(72) Inventors: Xin Zhang, Hangzhou (CN); Xueqi Liu, Hangzhou (CN); Xiaoqi Zhang, Hangzhou (CN); Jiuqing Cai, Hangzhou (CN); Sunqing Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/249,966

(22) Filed: Jun. 25, 2025

(65) Prior Publication Data

US 2026/0029785 A1 Jan. 29, 2026

(30) Foreign Application Priority Data

Jul. 29, 2024 (CN) .......................... 202411018230.0

(51) Int. Cl.
*G05B 23/02* (2006.01)

(52) U.S. Cl.
CPC ...... *G05B 23/0262* (2013.01); *G05B 2223/02* (2018.08)

(58) Field of Classification Search
CPC ................................................ G05B 2223/02
See application file for complete search history.

(56) References Cited

U.S. PATENT DOCUMENTS

| | | | | |
|---|---|---|---|---|
| 10,928,807 | B2 * | 2/2021 | Rashidi | ............. G05B 13/0265 |
| 12,235,311 | B1 * | 2/2025 | Zhang | .................. G01R 31/086 |
| 2020/0244398 | A1 * | 7/2020 | Anastasov | ............ G01S 13/584 |
| 2021/0293893 | A1 * | 9/2021 | Hassan | .................. G01R 31/40 |
| 2021/0326639 | A1 * | 10/2021 | Yang | ...................... G06V 10/82 |

FOREIGN PATENT DOCUMENTS

CN 117872038 B * 5/2024 ........... G01R 31/088

* cited by examiner

*Primary Examiner* — Santosh R Poudel
(74) *Attorney, Agent, or Firm* — Jiwen Chen; Joywin IP Law PLLC

(57) ABSTRACT

The present invention is an unsupervised integrated method of instability detection and fault module positioning, including: acquiring a topological structure of a direct current (DC) microgrid and collecting electrical data of each node in the topological structure to construct a corresponding first enhancement dataset and a corresponding second enhancement dataset; constructing a fault type pool based on the topological structure; constructing a corresponding classification network based on a twinborn network framework; training the classification network using the prepared datasets to obtain a detection model; and inputting the electrical data of the DC microgrid to be detected to a detection model, to output whether the DC microgrid to be detected has system stability and a corresponding fault type. Further provided in the present invention is an unsupervised integrated device of instability detection and fault module positioning.

10 Claims, 3 Drawing Sheets

UNSUPERVISED INTEGRATED METHOD AND DEVICE OF INSTABILITY DETECTION AND FAULT MODULE POSITIONING

FIELD OF TECHNOLOGY

The present invention belongs to the technical field of instability detection of power electronic systems, and particularly, relates to an unsupervised integrated method and device of instability detection and fault module positioning.

BACKGROUND TECHNOLOGY

With the development of photovoltaic, wind power, energy storage and direct current (DC) load, DC microgrids have been studied extensively. DC microgrids have been widely applied in multiple fields such as data center, electric automobile, ships, and aircrafts due to its excellent energy conversion efficiency, modular design, and good maintainability. However, DC microgrids are faced with huge challenge in the aspect of stability detection. The complex interaction among subsystems may result in system instability to seriously affect the operating efficiency and reliability of the entire system.

Conventional stability detection methods mainly include state space-based methods and impedance-based methods. The impedance-based methods are to directly measure the port impedance of the system without mastering the complex internal information of the system such that the system stability analysis is more convenient and efficient. The impedance-based stability test method is to inject disturbing signals into the system by means of stability criteria to acquire and analyze port impedance information, thus determining the system stability; and it can be divided into a hardware invasive method and software invasive method. However, these methods need to introduce disturbance signals and thus, may generate interference to the normal operation of the system to affect the quality of electric energy. As for complicated multi-node DC microgrids with multiple converters, it is very complicated to calculate and analyze impedance characteristics and thus, hard to achieve real-time detection. Meanwhile, an individual converter may also break down to further increase the complexity of the detection. Therefore, there is an urgent need for the development of a novel detection method and technology, so as to effectively detect the steady state of the DC microgrid and to achieve the real-time positioning in case that a converter module breaks down. Moreover, as the types of instability and fault in need of detection increase day by day, the conventional methods relying on manually labeling samples tags are faced with the problem of high price. To reduce the dependencies on labeling sample data, there is an urgent need for the development of an unsupervised learning method to achieve the integration of instability detection and fault module positioning.

Patent literature CN118133058A discloses a method for detecting voltage stability of small DC bus connected with microgrid power distribution in series. The method includes: acquiring voltage change data of a plurality of devices connected to a bus; determining a target similarity among the plurality of devices based on the voltage change data and the time-series information of the voltage change data; adjusting a raw distance of the voltage change data among the plurality of devices based on target similarity to obtain an adjusted distance; adjusting a radius of raw clusters to which the voltage change data of the plurality of devices belongs based on the adjusted distance; clustering the voltage change data of the plurality of devices based on the adjusted radius of clusters; and performing voltage stability detection on the voltage change data of the plurality of devices at the moment based on the clustering result. The method adopts a clustering method and relies upon the setting of a threshold value of the number of clusters, and parameters need to be set manually, and the accuracy rate cannot be guaranteed.

Patent literature CN118095082A discloses a method for assessing transient voltage stability based on a residual stochastic differential equation network, including step 1: constructing a stochastic differential equation network SDE-Net model based on an uncertainty to a new energy power grid; step 2: constructing a residual SDE-Net model, and obtaining a time-series sample by a method for extracting multichannel time-series features; step 3: constructing a residual SDE-Net training objective function, and solving an optimization problem using a Lagrangian loss function; step 4: constructing a transient voltage stability assessment model based on residual SDE-Net; and step 5: assessing a stability status of the transient voltage using the trained SDE-Net model, and testing on a test set to complete the on-line assessment of transient voltage stability. The method needs to label a voltage status corresponding to sample data, and a large number of manpower is required to label training sets for the grid system of multiple devices.

SUMMARY OF THE INVENTION

The object of the present invention is to provide an unsupervised integrated method and device of instability detection and fault module positioning. The method can achieve on-line instability detection and positioning without any label data, which can not only determine the system stability status, but also can accurately position the faulted converter module in the system.

To achieve the first objective of the present invention, provided is the following technical solution: an unsupervised integrated method of instability detection and fault module positioning, including the following steps:

acquiring a topological structure of a direct current (DC) microgrid and collecting electrical data of each node in the topological structure, intercepting the electrical data having the same data length at different time points, to construct a corresponding first enhancement dataset and a corresponding second enhancement dataset;

encoding a fault type of the nodes in an instable status of the DC microgrid and a correlation among the nodes based on the topological structure, to construct a fault type pool;

constructing a corresponding classification network including a data enhancement module, a feature extraction module, a target classification module, and a label mapping module based on a twinborn network framework; where the data enhancement module is configured to enhance the input electrical data and intercept a preset data length, to output enhancement data;

the feature extraction module is configured to extract a time-series feature of the enhancement data;

the target classification module is configured to perform classified calculation on the time-series feature, to output a corresponding classified time-series feature vector;

is the label mapping module is configured to input an input classified time-series feature vector to the fault type pool to construct a confusion matrix and perform label matching, to output an optimal matching result;

training the classification network using the first enhancement dataset and the second enhancement dataset, to obtain a detection model for instability detection and fault module positioning; and inputting the electrical data of the DC microgrid to be detected to the detection model, to output whether the DC microgrid to be detected has system stability and a corresponding fault type.

By an unsupervised learning framework based on a twinborn network, the present invention efficiently identifies and classifies faults in case of no pre-defined label to reduce the dependencies and costs of manual labeling. Meanwhile, fault features are automatically extracted in an end-to-end data feature extraction way. Moreover, efficient and precise performance is maintained under diversified complex operating conditions. In addition, constructing an advanced self-attention mechanism can dynamically adjust and optimize the feature extraction process, thus automatically capturing key features and time-series dependencies during analysis procedure to significantly enhance the precision and adaptability of the feature extraction.

Specifically, a type of the collected electrical data is determined by the number of converter modules connected to the same busbar in the topological structure of the DC microgrid based on the following specific rule:

when the number of the modules connected to the same busbar is greater than 2, a collection point and an electrical quantity are a major branch voltage and a current of each branch module; and when the number of the modules connected to the same busbar is not greater than 2, the collection point and the electrical quantity are the major branch voltage.

Specifically, the electrical data is collected on the basis of a sliding window method to construct voltage or current data having an input feature of a matrix size K×W.

Specifically, the feature extraction module further needs to be preprocessed before extracting a time-series feature of the electrical data, including normalization processing of the electrical data.

Specifically, the feature extraction module is constructed via an attention mechanism-convolutional neural network.

Specifically, in the feature extraction module, the time-series feature is extracted by the following process:

extracting a local feature of input data layer by layer via a plurality of convolutional layers; each of the convolutional layers includes convolution operation, nonlinear activation, and pooling operation; and calculating the extracted local feature using an attention mechanism, to obtain a corresponding feature representation;

where the feature representation is subjected to dimensionality reduction to an one-dimensional vector and is output as a corresponding time-series feature.

Specifically, a multi-head attention mechanism is adopted as the attention mechanism based on the following specific process:

mapping a matrix corresponding to the input data via linear conversion to a query matrix, a key matrix, and a value matrix;

calculating an attention weight based on dot products of the query matrix and the key matrix, and multiplying the attention weight with the value matrix to obtain a weighed output matrix; and performing splicing and linear conversion on outputs of all the heads, to obtain a final feature representation via nonlinear activation.

Specifically, the optimal matching result is output by the label mapping module based on the following specific process:

encoding the obtained classified time-series feature vector in an one-hot way to construct a confusion matrix having a size of $$\frac{(M+2)(M+1)}{2} \times \frac{(M+2)(M+1)}{2},$$

where M represents a data length of the intercepted electrical data;

transforming the constructed confusion matrix into a cost matrix, where elements are defined as $Cost_{i-j}=-d_{i-j}$, where i denotes an ith row in the matrix; j denotes a jth column in the matrix; and $Cost_{i-j}$ denotes an element in the ith row and the jth column of the cost matrix; and operating the cost matrix using a Hungary algorithm, to obtain an optimal matching method.

Specifically, during the training, an unsupervised contrastive loss of the target classification module is calculated under the first enhancement dataset and the second enhancement dataset based on a comparative loss function, and backpropagation is performed by a gradient descent algorithm to adjust a weighting parameter of a twinborn network.

To achieve the second object of the present invention, the following technical solution is provided: an unsupervised integrated device of instability detection and fault module positioning, which is implemented by the aforesaid unsupervised integrated method of instability detection and fault module positioning.

The specific execution step is as follows: deploying a trained model to a controller of a real system, in case of instability, inputting the collected electrical feature quantity into the control procedure to determine the type of the instability fault, thus performing instability monitoring and positioning.

Compared with the prior art, the present invention has the following advantageous effects:

By means of an unsupervised learning framework based on a twinborn network, the present invention achieves the model training task of a label-free dataset to reduce the dependencies and costs of manual labeling. Meanwhile, key features and time-series dependencies are automatically captured during analysis procedure to significantly enhance the precision and adaptability of the feature extraction. Hence, the constructed detection model can make a rapid response to the change of a fault condition to provide precise fault positioning and diagnosis results, thus significantly improving the operational reliability and safety of the DC microgrid.

DETAILED DESCRIPTION OF THE EMBODIMENTS

Exemplary embodiments of the present invention will be introduced with reference to the accompanying drawings. However, the present invention may be implemented via lots of different forms, and not limited to the embodiments described here. These embodiments are provided to completely disclose the present invention in detail, and to fully convey the scope of the present invention to those skilled in the art. Terms denoted in the exemplary embodiments of the accompanying drawings are not construed as limiting the present invention. In the accompanying drawings, the same unit/element is denoted using the same numerals.

The terms used here (inclusive of technical terms) have usual meanings for those skilled in the art, unless otherwise stated. In addition, it is appreciable that the terms defined via commonly used dictionaries shall be understood to have consistent meanings with the context of the related field, but not construed as idealized or too formal meanings.

Figure 1:
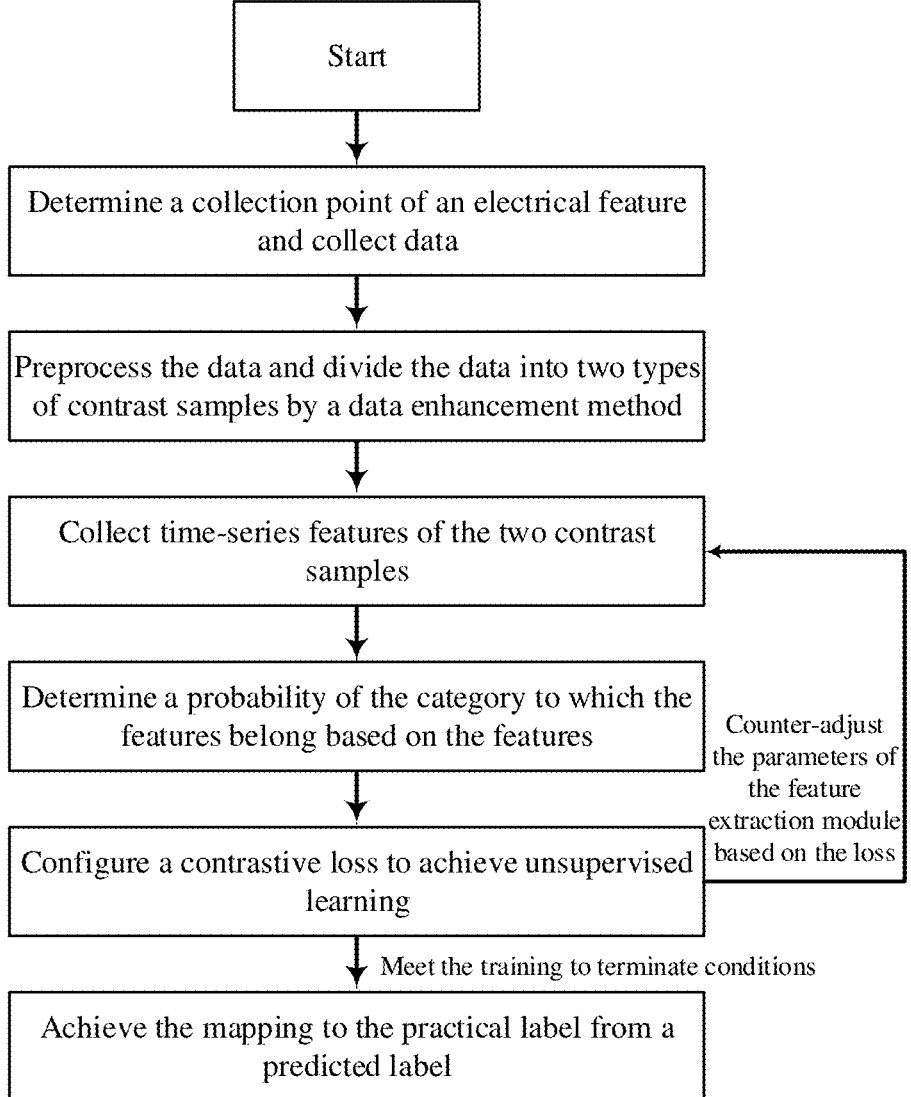
FIG. 1 is a flow diagram showing an unsupervised integrated method of instability detection and fault module positioning provided in the embodiments.

FIG. 1 shows an unsupervised integrated method of instability detection and fault module positioning, including the following specific steps:

determining the number M of converter modules and the required collection nodes K by a topological structure of a DC microgrid, and performing electrical data collection on such K nodes by a sliding window technique, to obtain real time data with high frequency and high precision;

performing normalization processing on the collected electrical data of the K nodes, and intercepting the electrical data having the same data length at different time points to construct a corresponding first enhancement dataset and a corresponding second enhancement dataset, thereby enhancing diversity and robustness of the data;

performing one-hot coding on a fault type of the nodes in an instable status of the DC microgrid and a correlation among the nodes based on the topological structure, to construct a fault type pool;

constructing a corresponding classification network including a data enhancement module, a feature extraction module, a target classification module, and a label mapping module based on a twinborn network framework;

the data enhancement module being configured to enhance input the electrical data and intercept a preset data length, to output enhancement data;

the feature extraction module being configured to extract a time-series feature of the enhancement data;

the target classification module being configured to perform classified counting on the time-series feature, to output a corresponding classified time-series feature vector;

the label mapping module being configured to input an input classified time-series feature vector to the fault type pool to construct a confusion matrix and perform label matching, to output an optimal matching result;

training the classification network using the first enhancement dataset and the second enhancement dataset, to obtain a detection model for instability detection and fault module positioning; and inputting the electrical data of the DC microgrid to be detected to the detection model, to output whether the DC microgrid to be detected has system stability and a corresponding fault type.

More specifically, the electrical data is collected as follows:

step 1-1: inputting a DC microgrid topology containing M converter modules; and step 1-2: determining collection points and collected electrical quantity according to the number of modules connected to the same bus;

when the number of the modules connected to the same busbar is greater than 2, a collection point and an electrical quantity are a major branch voltage and a current of each branch module; and when the number of the modules connected to the same busbar is not greater than 2, the collection point and the electrical quantity are the major branch voltage;

step 1-3: collecting data using a sliding window having a size of W after determining the collection point; and step 1-4: finally, combining voltage/current data collected at the K collection points to construct a sample data feature matrix, to obtain that the input feature of each sample is a matrix having a size of K×W.

Figure 2:
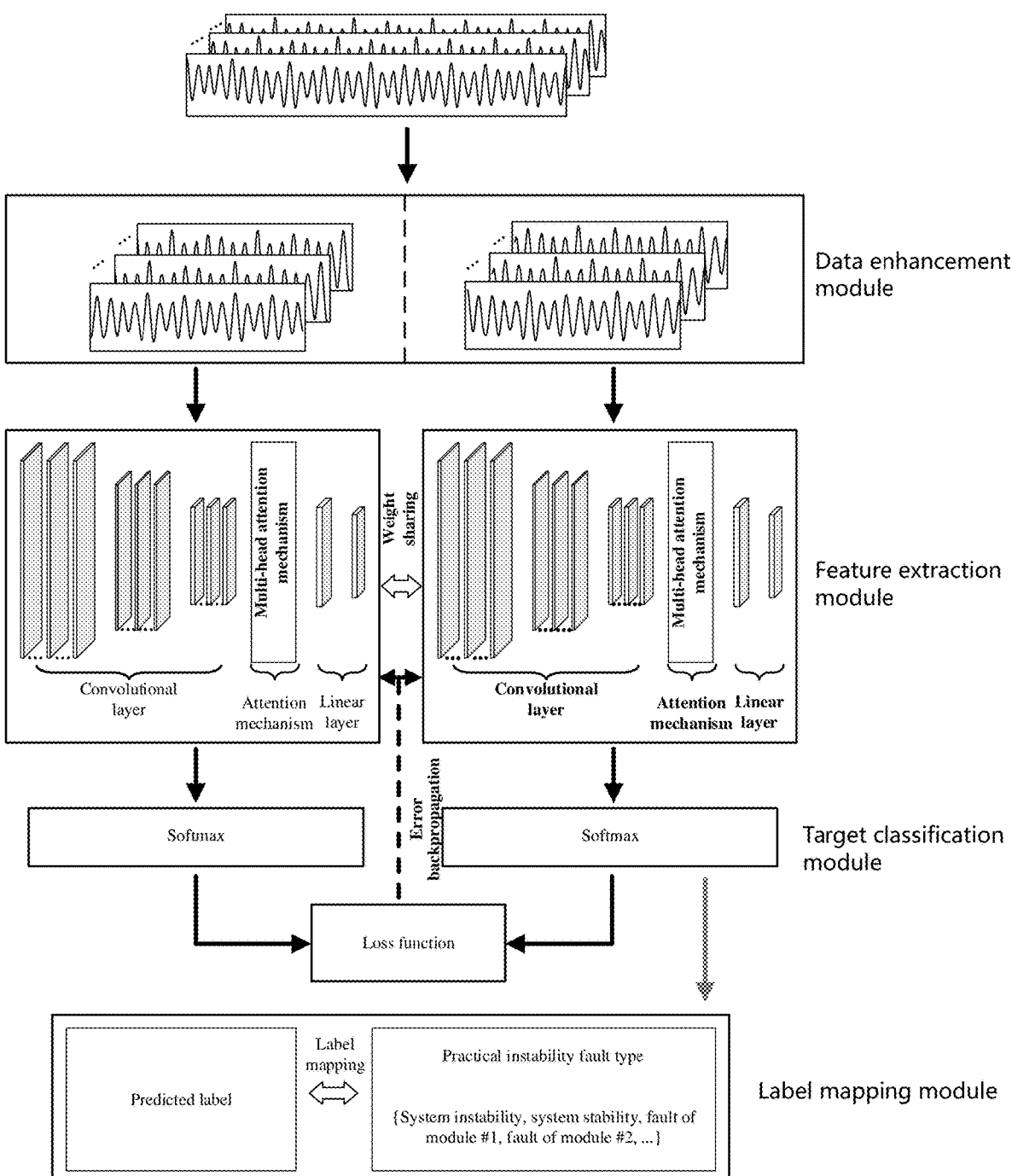
FIG. 2 is a schematic diagram showing a model constructed on the basis of a twinborn network framework provided in the embodiments.

FIG. 2 shows a corresponding classification network constructed on the basis of a twinborn network framework provided in the embodiments.

During the training process, the feature extraction module is based on the twinborn network framework; time-series features are extracted by the twinborn network via an attention mechanism-convolutional neural network. The first enhancement data and the second enhancement data are respectively input to two feature extraction modules $N_1$ and $N_2$ of the twinborn network; the two modules share a weight, and each module is extracted by the following process:

Firstly, a convolutional operation is performed such that local features of a sample are extracted by a plurality of convolutional layers layer by layer. Each of the convolutional layers includes convolution operation, nonlinear activation, and pooling operation; and dimensionality of data is gradually reduced and important features are highlighted. The local patterns, e.g., trend change and mutational site of the sample in time series may be captured by a network via the convolutional layers.

After the convolutional operation, the sample enters into the attention mechanism part. This part adopts a multi-head attention mechanism, and each head is subjected to the following operation:

First, the input matrix is mapped into a query matrix, a key matrix, and a value matrix via linear conversion; and an attention weight is calculated based on dot products of the query matrix and the key matrix, and the attention weight is multiplied by the value matrix to obtain a weighed output matrix. Finally, outputs of all the heads are subjected to splicing and linear conversion, to obtain a final feature representation via nonlinear activation. By the above process, the information of each time point in the sample should be considered, and contributions of other time points should be further taken into account, which may effective capture the correlation of each time point in the sequence, in particular to long-distance dependencies, thus enhancing the model's feature extraction ability to time-series data.

The sample enters into a linearized layer after being processed by convolution and attention mechanisms. The layer is configured to map multi-dimensional features into one-dimensional vectors for the convenience of follow-up processing. Specifically, the feature vectors are converted by the linearized layer into a one-dimensional (M+2)(M+1)/2 output form, where M is the number of the converter modules. Such a step is completed via a fully connected layer to ensure the fixation of the output feature vector dimensionality and the effective integration of data, which gets ready for the processing of the subsequent Softmax classification layer.

In the above operations, $N_1$ and $N_2$ share a weight, and two types of enhancement samples of each sample are extracted via $N_1$ and $N_2$, respectively, to obtain outputs $X_1$ and $X_2$.

Directed to the target classification module: the outputs $X_1$ and $X_2$ of the feature extraction module are subjected to Softmax layer processing to obtain outputs $F_1$ and $F_2$; $F_1$ and $F_2$ have a length of $(M+2)(M+1)/2$ indicating there are $(M+2)(M+1)/2$ instability fault types in total. Such a configuration may not only determine the instability status of the system, but also may position the fault of the M modules, including a simple module fault, fault concurrence of two modules, . . . , and fault concurrence of M modules.

Directed to a label mapping module: there are $$\frac{(M+2)(M+1)}{2}$$

types of faults in the fault type pool in total, a similarity comparison is firstly performed between a typical sample feature of each fault type in the fault type pool and a first classified time-series feature vector in a training set sample; when the similarity between the first classified time-series feature vector and the typical sample feature of the fault type is up to the maximum, the sample is regarded to fall within the category. Hence, the clustering label of each sample may be obtained via determination.

The output of the target classification module is transformed into an one-hot way to obtain a predicted label, and meanwhile, a confusion matrix D having a size of $$\frac{(M+2)(M+1)}{2} \times \frac{(M+2)(M+1)}{2}$$

is constructed to indicate a corresponding correlation between the predicted label and the clustering label.

The confusion matrix is transformed into a cost matrix Cost via conversion, and elements are defined as: $\text{Cost}_{i\text{-}j} = -d_{i\text{-}j}$.

Operations are performed on the cost matrix Cost using Hungary algorithm to find out the optimal matching scheme which may perform an optimal alignment on the real label and the predicted label, thus obtaining the physical fault type represented by the predicted one-hot label.

Further provided in the examples is an unsupervised integrated device of instability detection and fault module positioning, including a memory and a processor; the memory stores computer programs, and the processor executes the computer programs to achieve the above unsupervised integrated method of instability detection and fault module positioning.

The present invention may real-timely monitor and position the failure source of the converter instability in the DC microgrid without the need for label data. By an unsupervised learning framework based on a twinborn network, the present invention may efficiently identify and classify the faults in case of no pre-defined label to reduce the dependencies and costs of the manual labeling. Moreover, the present invention may automatically extract the fault features in an end-to-end data feature extraction way, and may maintain efficient and precise performance under diversified complex operating conditions. The system is internally provided with an advanced self-attention mechanism and thus, may dynamically adjust and optimize the feature extraction process such that key features and time-series dependencies are automatically captured in the analysis process, thus significantly improving the precision and adaptability of the feature extraction. Such a self-attention mechanism ensures the wide applicability and robustness of the system under different operating conditions and environmental changes. Moreover, the present invention further possesses a powerful adaptive ability and may make a rapid response to the change of the fault condition to provide precise fault positioning and diagnosis results, thus significantly improving the operational reliability and safety of the DC microgrid.

Figure 3:
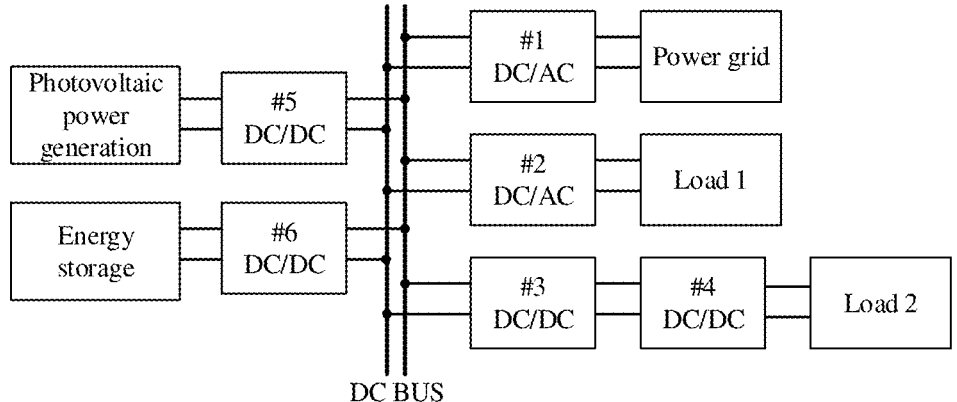
FIG. 3 is a schematic diagram showing a topological structure of a DC microgrid provided in the embodiments.

To specify the method provided in the present invention and the technical effect better, the power electronic/electrical power system as shown in FIG. 3 is set as an example to specify the unsupervised integrated method of instability detection and fault module positioning.

In the figure, DC bus serves as the trunk of the system; a photovoltaic power module, an energy storage module, a power grid, an AC load 1, and DC load 2 are disposed at both sides of the trunk, and are each switched in the DC bus via the corresponding power converter.

First, the data collection module is running to determine collection points and collect electrical quantities, and data features are collected via a sliding window method:

(1) The topological structure as shown in FIG. 3 is input, where the number of the converter modules is M=6.

(2) The converter modules #1, #2, #3, #5, and #6 are connected at both sides of the same busbar; hence, the collection points are the busbar voltage and the current of the converter modules #1, #2, #3, #5 and #6 at the joint points with the busbar. As the converter modules #3 and #4 are connected at same busbar, the collection points are the busbar voltage. Finally, the number of the collection points are determined K=7.

(3) Voltage/current data at each collection point is collected by a sliding window method, and the sliding window has a size of W, and W is 8000 herein.

(4) A feature data matrix having a size of 7×8000 is obtained to each sample. 5000 sets of samples are collected as training sets to train an unsupervised framework of instability detection and fault module positioning.

As for each sample, the collected 7×8000 feature data matrix is then input to the data enhancement module for processing with normalization and other preprocessing methods, and then the feature data matrix 7×8000 is sheared to two categories of 7×5000 shear feature data matrices via a data shear method; these two categories of shear data are the same length data sheared from the primary sample at different time points.

Afterwards, the two different categories of feature data matrices are respectively input to two feature extraction modules $N_1$ and $N_2$ having the same weight to perform the following operation:

(1) Each module is subjected to convolutional operation firstly, and a local feature of the sample is extracted layer by layer via a plurality of convolutional layers. Each of the convolutional layers includes convolution operation, nonlinear activation, and pooling operation; and dimensionality of data is gradually reduced and important features are highlighted. The local patterns, e.g., trend change and mutational site of the sample in time series may be captured by a network via the convolutional layers. The modules $N_1$ and $N_2$ obtain the feature vector matrix after the convolution, respectively $$C_1 = [c_1^1, c_1^2, \ldots, c_1^i \ldots, c_1^T], C_2 = [c_2^1, c_2^2, \ldots, c_2^i, \ldots, c_2^T]$$

where, $$c_1^i$$

denotes the feature vector at the ith time step of the shear feature data matrix 1 after being extracted by the convolutional layers in $N_1$;

$$c_2^i$$

denotes the feature vector at the ith time step of the shear feature data matrix 1 after being extracted by the convolutional layers in $N_1$; and T denotes a sequence length after the extraction of the convolutional layers; and
    (2) after the convolutional operation, the sample enters into the attention mechanism part. This part adopts a multi-head attention mechanism, and the nth head is subjected to the following operation ($C_1$ is set as an example):
    the input matrix $C_1$ is mapped into a query matrix, a key matrix, and a value matrix. These three matrices are respectively subjected to linear conversion to obtain:

$$Q_n = C_1 W_n^Q, K_n = C_1 W_n^K, V_n = C_1 W_n^V$$

wherein, $Q_n$, $K_n$, and $V_n$ are respectively the query matrix, the key matrix, and value matrix of the nth head, respectively;

$$W_n^Q, W_n^K, \text{ and } W_n^V$$

are weight matrices of the nth head to be learned.
    The attention weight is calculated by dot products of the query and key matrices, and normalized via a Softmax function:

$$A_n = \text{softmax}\left(\frac{Q_n K_n^T}{\sqrt{d_k}}\right)$$

wherein, $d_k$ denotes a vector dimensionality; $A_n$ denotes an attention weight matrix; and $$\frac{1}{\sqrt{d_k}}$$

denotes a zoom factor configured to avoid gradient vanishing of the Softmax function due to a too large dot product value.
    The attention weight is multiplied by the value matrix to obtain a weighed output of the nth head;

$$Z_n = A_n V_n$$

wherein, $Z_n$ denotes an output matrix of the nth head after being adjusted by the attention mechanism, inclusive of the global context information.
    Finally, the outputs of all the heads are subjected to splicing and linear conversion:

$$Z = concat(Z_1, Z_2, \ldots, Z_h) W^O$$

wherein, $W^O$ is an output conversion matrix having h heads in total.
    The output Z of the multiple-head attention is subjected to linear conversion and nonlinear activation, to obtain a final feature representation:

$$H = ReLU\left(Z W^H + b^H\right)$$

wherein, $W^H$ and $b^H$ denote the weight and offset of the linear conversion, and H denotes the final feature representation matrix.
    (3) The sample enters into the linearization layer after being processed via convolution and attention mechanism. The layer is configured to map multi-dimensional features into one-dimensional vectors for the convenience of follow-up processing. Specifically, the feature vectors are converted by the linearized layer into a one-dimensional $(M+2)(M+1)/2$ output form, where M is the number of the converter modules. Such a step is completed via a fully connected layer to ensure the fixation of the output feature vector dimensionality and the effective integration of data, which gets ready for the processing of the subsequent Softmax classification layer.
    In the above operations, $N_1$ and $N_2$ share a weight, and two types of enhancement samples of each sample are extracted via $N_1$ and $N_2$, respectively, to obtain outputs $X_1$ and $X_2$.
    The output $X_1$ and $X_2$ are then subjected to Softmax layer processing to obtain outputs $F_1$ and $F_2$ both having a length of 21, which corresponds 21 fault categories, including instability, stability, fault of converter modules #1-#6, simultaneous fault of converter modules #1 and #2, simultaneous fault of converter modules #1 and #3, etc.
    $F_1$ and $F_2$ are then input to a contrastive loss module which may minimize the difference between the same samples and maximize the difference between different samples simultaneously; the specific loss is as follows:

$$L(F_1, F_2) = \frac{1}{2B} \sum_{i=1}^{B} [D_{KL}(F_{1i} \| F_{2i}) + D_{KL}(F_{2i} \| F_{1i})] +$$

$$\frac{\alpha}{2}\left[\frac{1}{B}\sum_{i=1}^{B} H(F_{1i}) + \frac{1}{B}\sum_{i=1}^{B} H(F_{2i})\right] - \frac{\beta}{2}\left[H\left(\frac{1}{B}\sum_{i=1}^{B} F_{1i}\right) + H\left(\frac{1}{B}\sum_{i=1}^{B} F_{2i}\right)\right]$$

wherein, B denotes the number of samples randomly drawn for training, and is 64 herein; $F_{1i}$ and $F_{2i}$ denote classification feature vectors of the ith sample after being processed by the data enhancement module, the feature extraction module, and the target classification module, specifically $$\left(F_{1i}^1, F_{1i}^2, \ldots, F_{1i}^{21}\right) \text{ and } \left(F_{1i}^1, F_{1i}^2, \ldots, F_{1i}^{21}\right);$$

α and β are adjustable hyper-parameters; $D_{KL}(F_{1i}\|F_{2i})$ and $D_{KL}(F_{2i}\|F_{1i})$ are KL divergences between $F_{2i}$ and $F_{1i}$ to measure the difference between the two probability distributions, and to respectively measure the loss when $F_{1i}$ is approximated by $F_{2i}$ and the loss when $F_{2i}$ is approximated by $F_{1i}$, and the smaller the loss, the smaller the difference therebetween; $H(F_{1i})$ and $H(F_{2i})$ respectively denote entropies of the vectors $F_{1i}$ and $F_{2i}$ of the ith sample; and the smaller the entropy, the higher the certainty of the vector;

$$H\left(\frac{1}{B}\sum_{i=1}^{B}F_{1i}\right) \text{ and } H\left(\frac{1}{B}\sum_{i=1}^{B}F_{2i}\right)$$

denote entropies of the sum of the mean values of the classification feature vectors of the same category of enhancement sample obtained after processing 64 samples with the data enhancement module, the feature extraction module, and the target classification module. That is, $$H\left(\frac{1}{B}\sum_{i=1}^{B}F_{1i}\right)$$

denotes the entropy of the sum of the mean values of the $F_1$ classification feature vectors of the 64 samples, and $$H\left(\frac{1}{B}\sum_{i=1}^{B}F_{2i}\right)$$

denotes the entropy of the sum of the mean values of the $F_2$ classification feature vectors of the 64 samples; the larger the mean entropy, the larger the difference among the 64 different samples.

After the loss is obtained, the loss is subjected to back-propagation by a gradient descent algorithm to adjust the parameters of the twinborn training network.

When the loss reduces to meet the requirements, the trained model is obtained, and then it is necessary to know the type of the practical instability represented by the predicted label. Mapping is implemented by the following steps for acquisition:

The first classification feature vector $F_1$ of the 1000 samples and the first time-series feature vector $X_1$ of the 64 samples are known.

(1) The first time-series feature vectors $X_1$ of the 1000 samples are input to the fault type pool. The fault type pool contains three types of "stability", "instability", and "fault of module #1", and each fault type corresponds to a typical fault feature. The 1000 samples are subjected to a similarity comparison with the three fault types, respectively; if the $1^{st}$ sample has a similarity with the typical fault feature under the "stability" of greater than the similarities with the "instability" and "fault of module #1", the clustering label of the $1^{st}$ sample is regarded as "stability".

(2) The first classification feature vectors $F_1$ of the 1000 samples are converted into an one-hot encoding way to obtain the predicted labels of the 1000 samples, being "100", "010", or "001", respectively.

(3) A confusion matrix D having a size of 3×3 is constructed, $$D = \begin{pmatrix} d_{1-1} & d_{1-2} & d_{1-3} \\ d_{2-1} & d_{2-2} & d_{2-3} \\ d_{3-1} & d_{3-2} & d_{3-3} \end{pmatrix}$$

wherein, $d_{1-1}$ denotes the number of the samples having a predicted label of "100" and a clustering label of "instability"; $d_{1-2}$ denotes the number of the samples having a predicted label of "100" and a clustering label of "stability"; and $d_{1-3}$ denotes the number of the samples having a predicted label of "100" and a clustering label of "fault of module #1". Similarly, $d_{2-1}$ denotes the number of the samples having a predicted label of "010" and a clustering label of "instability"; $d_{2-2}$ denotes the number of the samples having a predicted label of "010" and a clustering label of "stability"; and $d_{2-3}$ denotes the number of the samples having a predicted label of "010" and a clustering label of "fault of module #1". $d_{2-1}$ denotes the number of the samples having a predicted label of "001" and a clustering label of "instability"; $d_{2-2}$ denotes the number of the samples having a predicted label of "001" and a clustering label of "stability"; and $d_{2-3}$ denotes the number of the samples having a predicted label of "001" and a clustering label of "fault of module #1".

(4) The confusion matrix is converted into a cost matrix Cost, Cost=−D $$Cost = \begin{pmatrix} Cost_{1-1} & Cost_{1-2} & Cost_{1-3} \\ Cost_{2-1} & Cost_{2-2} & Cost_{2-3} \\ Cost_{3-1} & Cost_{3-2} & Cost_{3-3} \end{pmatrix}$$

(5) Operations are performed on the cost matrix Cost using a Hungary algorithm to find out the optimal matching scheme which may perform an optimal alignment on the real label and the predicted label, thus obtaining the real fault type represented by the predicted one-hot label. Assuming that the output result of the Hungary algorithm is [(0, 2), (1, 1), (2, 0)], it means: the predicted label "100" corresponds the practical category "fault of module #1", the predicted label "010" corresponds the practical category "instability", and the predicted label "001" corresponds the practical category "stability".

Based on the mapping relation, the fault feature may be known directly according to the first classification feature vector without any label in practical applications.

Moreover, terms "upper", "lower", "inner", "outer", "front", and back" are merely illustrative of description, but are not construed as indicating or implying the relative importance. The relative steps, numerical expressions and values of the components and steps described in these embodiments are not construed as limiting the scope of the present invention, unless otherwise specified.

Of course, what is described above are merely detailed embodiments of the present invention, but are not construed as limiting the implementation scope of the present invention. Any equivalent change or modification made on the basis of the structures, features, and theories within the scope of the invention patent application shall fall within the scope of the invention patent application.

Finally, it should be indicated that the above-mentioned embodiments are merely detailed embodiments of the present invention, and for illustrative of the technical solutions of the present invention, but are not construed as limiting the protection scope of present invention. Even though the present invention is described in detail with reference to the preceding embodiments, those skilled in the art should understand as follows: the technical solutions recited in the preceding embodiments could be still amended, readily changed, or partial technical features therein are equivalently replaced by those skilled in the art within the technical scope of the present invention. Moreover, those amendments, changes, or replacements will not enable the essence of the corresponding technical solutions to depart from the spirit and scope of the technical solution in each embodiment of the present invention, but shall fall within the protection scope of the present invention. Therefore, the protection scope of the present invention shall be subject to that of the claims.

What is claimed is:

1. An unsupervised integrated method of instability detection and fault module positioning, comprising following steps:

acquiring a topological structure of a direct current (DC) microgrid and collecting electrical data of each node in the topological structure, intercepting the electrical data having the same data length at different time points, to construct a corresponding first enhancement dataset and a corresponding second enhancement dataset;

encoding a fault type of the nodes in an instable status of the DC microgrid and a correlation among the nodes based on the topological structure, to construct a fault type pool;

constructing a corresponding classification network comprising a data enhancement module, a feature extraction module, a target classification module, and a label mapping module based on a twinborn network framework;

the data enhancement module being configured to enhance input electrical data and intercept the input electrical data with a preset data length, to output enhancement data;

the feature extraction module being configured to extract a time-series feature of the enhancement data;

the target classification module being configured to perform classified calculation on the time-series feature, to output a corresponding classified time-series feature vector; and the label mapping module being configured to input the classified time-series feature vector to the fault type pool to construct a confusion matrix and perform label matching, to output an optimal matching result;

training the classification network using the first enhancement dataset and the second enhancement dataset, to obtain a detection model for instability detection and fault module positioning; and inputting the electrical data of the DC microgrid to be detected to the detection model, to output whether the DC microgrid to be detected has system stability and a corresponding fault type.

2. The unsupervised integrated method of instability detection and fault module positioning according to claim 1, wherein a type of the collected electrical data is determined by the number of converter modules connected to the same busbar in the topological structure of the DC microgrid based on following specific rule:

when the number of the modules connected to the same busbar is greater than 2, a collection point and an electrical quantity are a major branch voltage and a current of each branch module; and when the number of the modules connected to the same busbar is not greater than 2, the collection point and the electrical quantity are the major branch voltage.

3. The unsupervised integrated method of instability detection and fault module positioning according to claim 1, wherein the electrical data is collected on the basis of a sliding window method to construct voltage or current data having an input feature of a matrix size K×W.

4. The unsupervised integrated method of instability detection and fault module positioning according to claim 1, wherein the feature extraction module further needs to be preprocessed before extracting a time-series feature of the electrical data, comprising normalization processing of the electrical data.

5. The unsupervised integrated method of instability detection and fault module positioning according to claim 1, wherein the feature extraction module is constructed via an attention mechanism-convolutional neural network.

6. The unsupervised integrated method of instability detection and fault module positioning according to claim 1, wherein in the feature extraction module, the time-series feature is extracted by following process:

extracting a local feature of input data layer by layer via a plurality of convolutional layers, wherein each of the convolutional layers comprises convolution operation, nonlinear activation, and pooling operation; and calculating the extracted local feature using an attention mechanism, to obtain a corresponding feature representation;

wherein the feature representation is subjected to dimensionality reduction to an one-dimensional vector and is output as a corresponding time-series feature.

7. The unsupervised integrated method of instability detection and fault module positioning according to claim 6, wherein a multi-head attention mechanism is adopted as the attention mechanism based on following specific process:

mapping a matrix corresponding to the input data via linear conversion to a query matrix, a key matrix, and a value matrix;

calculating an attention weight based on dot products of the query matrix and the key matrix, and multiplying the attention weight by the value matrix to obtain a weighed output matrix; and performing splicing and linear conversion on outputs of all the heads, to obtain a final feature representation via nonlinear activation.

8. The unsupervised integrated method of instability detection and fault module positioning according to claim 1, wherein the optimal matching result is output by the label mapping module based on following specific process:

encoding the obtained classified time-series feature vector in an one-hot way to construct a confusion matrix having a size of $$\frac{(M+2)(M+1)}{2} \times \frac{(M+2)(M+1)}{2},$$

wherein M represents a data length of the intercepted electrical data;

transforming the constructed confusion matrix into a cost matrix, wherein elements are defined as $Cost_{i\text{-}j} = -d_{i\text{-}j}$, wherein i denotes an ith row in the matrix; j denotes a jth column in the matrix; and $Cost_{i\text{-}j}$ denotes an element in the ith row and the jth column of the cost matrix; and operating the cost matrix using a Hungary algorithm, to obtain an optimal matching method.

9. The unsupervised integrated method of instability detection and fault module positioning according to claim 1, wherein during the training, an unsupervised contrastive loss of the target classification module is calculated under the first enhancement dataset and the second enhancement dataset based on a comparative loss function, and backpropagation is performed by a gradient descent algorithm to adjust a weighting parameter of a twinborn network.

10. An unsupervised integrated device of instability detection and fault module positioning, which is implemented by the unsupervised integrated method of instability detection and fault module positioning of claim 1.

<center>*   *   *   *   *</center>